United States Patent
Higgins

(10) Patent No.: US 8,599,994 B2
(45) Date of Patent: Dec. 3, 2013

(54) FUEL BUNDLE AND SPACER BAND

(75) Inventor: Russell Patrick Higgins, Wilmington, NC (US)

(73) Assignee: General Electric Company, Schenectady, NY (US)

(*) Notice: Subject to any disclaimer, the term of this patent is extended or adjusted under 35 U.S.C. 154(b) by 1104 days.

(21) Appl. No.: 11/741,391

(22) Filed: Apr. 27, 2007

(65) Prior Publication Data
US 2008/0267340 A1   Oct. 30, 2008

(51) Int. Cl.
*G21C 3/34* (2006.01)

(52) U.S. Cl.
USPC ........... 376/438; 376/409; 376/426; 376/434; 376/462

(58) Field of Classification Search
USPC .................................................. 376/438, 462
See application file for complete search history.

(56) References Cited

U.S. PATENT DOCUMENTS

| | | | | |
|---|---|---|---|---|
| 3,719,560 A | * | 3/1973 | Mayers et al. | 376/442 |
| 3,856,623 A | * | 12/1974 | Kamo | 376/440 |
| 4,740,350 A | * | 4/1988 | Taleyarkhan | 376/441 |
| 5,267,291 A | | 11/1993 | Matzner et al. | |
| 5,404,383 A | | 4/1995 | Nylund | |
| 6,385,271 B2 | * | 5/2002 | Nylund | 376/439 |
| 2007/0030943 A1 | * | 2/2007 | Makovicka et al. | 376/442 |

FOREIGN PATENT DOCUMENTS

| | | |
|---|---|---|
| JP | 64-006793 | 1/1989 |
| JP | 01006793 A * | 1/1989 |
| JP | 03-030894 | 2/1991 |

OTHER PUBLICATIONS

English Translation of Japanese Patent Application Publication No. 01006793 ("Narabayashi").*
Japan Notice of Allowance dated Mar. 19, 2013 and English Translation thereof.

* cited by examiner

*Primary Examiner* — Jack W Keith
*Assistant Examiner* — Marshall O'Connor
(74) *Attorney, Agent, or Firm* — Harness, Dickey & Pierce, P.L.C.

(57) ABSTRACT

In various embodiments, a spacer grid for a nuclear reactor fuel bundle is provided. The grid includes a plurality of interstitial dividers that form an array of cells. Each cell is structured to retain a respective one of a plurality of fuel rods to thereby form an array of equally spaced fuel rods. The grid additionally includes a perimeter band that peripherally surrounds the dividers and is connected to opposing ends of each divider. The perimeter band includes a plurality of spring tabs formed along and extending from an edge of the perimeter band. The spring tabs extend from the edge at an angle away from the dividers such that a distal end of each spring tab will contact an interior surface of a respective one of a plurality of walls of a channel in which the arrayed fuel rods can be inserted to form the fuel bundle.

23 Claims, 4 Drawing Sheets

FUEL BUNDLE AND SPACER BAND

FIELD

The present teachings relate to nuclear reactor fuel bundles and more particularly to the spacer grids that group the fuel rods of the bundles within the channels of the fuel bundles.

BACKGROUND

The statements in this section merely provide background information related to the present disclosure and may not constitute prior art.

Nuclear reactors, such as boiling water reactors, generally include a reactor core comprised of many fuel bundles through which, and around which, a liquid moderator, e.g., liquid water, flows. Nuclear reactions within the fuel bundles generate heat used to convert the moderator to steam as the moderator passes through the core. The steam is then used to generate electrical power. Each of the fuel bundles typically includes a plurality of sealed and vertically upstanding fuel rods housed within an elongate tubular channel. Within the channel, the fuel rods of each fuel bundle are held in a spaced apart configuration by two or more spacer grids comprised of a plurality of interconnected spacers that form a plurality of rows and columns of open cells. Each cell has a respective one of the otherwise long and flexible fuel rods extending therethrough and serves to prevent the fuel rods from coming into abrading contact one with another under the dynamics of moderator flow within the reactor. The spacers additionally maintain the designed fuel rod to fuel rod spacing for optimum nuclear performance. The spacer grids typically include a perimeter band that provides an outer defining envelope for the spacer cells and the fuel rods placed therein.

Known spacer grid designs are typically sized such that a small gap exists between the perimeter band and the walls of the channel that allows the grouped fuel rods, i.e., the fuel rods retained within the spacer grids, to be more easily inserted into the respective channels. However, this gap allows movement of the grouped fuel rods within the respective channels. For example, when the fuel bundles are placed within a reactor, such movement can be caused by many forces within the reactor, such as the moderator flow. Movement of the grouped fuel rods within a reactor can cause some of the peripheral, i.e., outermost, fuel rods of the group to move towards the channel walls while other peripheral fuel rods are moved away from the channel walls. When any of the peripheral fuel rods move toward one or more of the channel walls, the flow of the moderating coolant is inhibited at these highly reactive fuel rods. Inhibition of coolant flow causes critical power losses at these peripheral fuel rods, especially at the fuel rods adjacent the corners of the channel. As a result, the entire fuel bundle must be limited in its performance so that these critical power limits of the peripheral fuel rods are not exceeded.

Another example of the grouped fuel rods moving within the respective channel occurs during shipping of the fuel bundles. During shipping, the gap between the channel and the spacer grids can allow the grouped fuel rods to move, or 'rattle', within the channels and cause structural damage to the spacers grids and fretting damage to the fuel rods.

A further disadvantage of known spacer grids, particularly the perimeter band, is that the structural design of such spacer grids can inhibit the flow of coolant between the channel walls and the peripheral fuel rods, which can limit the energy generating potential of the peripheral fuel rods. Further yet, the perimeter bands do little or nothing to 'strip' coolant from the channel walls so that the coolant is utilized to cool the grouped fuel rods.

SUMMARY

According to one aspect, a spacer grid for a nuclear reactor fuel bundle is provided. In various embodiments the spacer grid includes a plurality of interstitial dividers that form an array of cells. Each cell is structured to retain a respective one of a plurality of fuel rods to form an array of equally spaced fuel rods. The spacer grid additionally includes a perimeter band peripherally surrounding the dividers and connected to opposing ends of each divider. The perimeter band includes a plurality of spring tabs formed along an edge of the perimeter band. The spring tabs extend from the edge at an angle away from the dividers such that a distal end of each spring tab will contact an interior surface of a respective one of a plurality of walls of a channel in which the arrayed fuel rods can be inserted to form the fuel bundle.

According to another aspect, a fuel bundle for a nuclear reactor is provided. In various embodiments, the fuel bundle includes a plurality of fuel rods, a spacer grid including a plurality of interstitial dividers, and a perimeter band peripherally surrounding the dividers. The perimeter band is connected to opposing ends of each divider to form an array of cells. Each cell structured to have a respective one of the fuel rods received therein to form an array of equally spaced fuel rods. The fuel bundle additionally includes an elongate tubular channel in which the arrayed fuel rods are housed. A plurality of spring tabs extend from an edge of the perimeter band at an angle away from the dividers such that a distal end of each spring tab contacts an interior surface of a respective one of a plurality of walls of the channel.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 1 is a perspective sectional view of a nuclear reactor illustrating a fuel bundle including a fuel rod spacer grid, in accordance with various embodiments of the present disclosure.

FIG. 2A is a top view of the spacer grid shown in FIG. 1, in accordance with various embodiments of the present disclosure.

FIG. 2B is a side view of the spacer grid shown in FIG. 2A.

FIG. 3 is an isometric sectional view of the spacer grid shown in FIG. 1 illustrating a corner spring tab of the spacer grid, in accordance with various embodiments of the present disclosure.

FIG. 4 is a side view of the spacer grid shown in FIG. 1, in accordance with various other embodiments of the present disclosure.

FIG. 5 is a side view of the spacer grid shown in FIG. 1, in accordance with yet other various embodiments of the present disclosure.

FIG. 6 is a side view of the spacer grid shown in FIG. 1, in accordance with still other various embodiments of the present disclosure.

DETAILED DESCRIPTION

Figure 1:
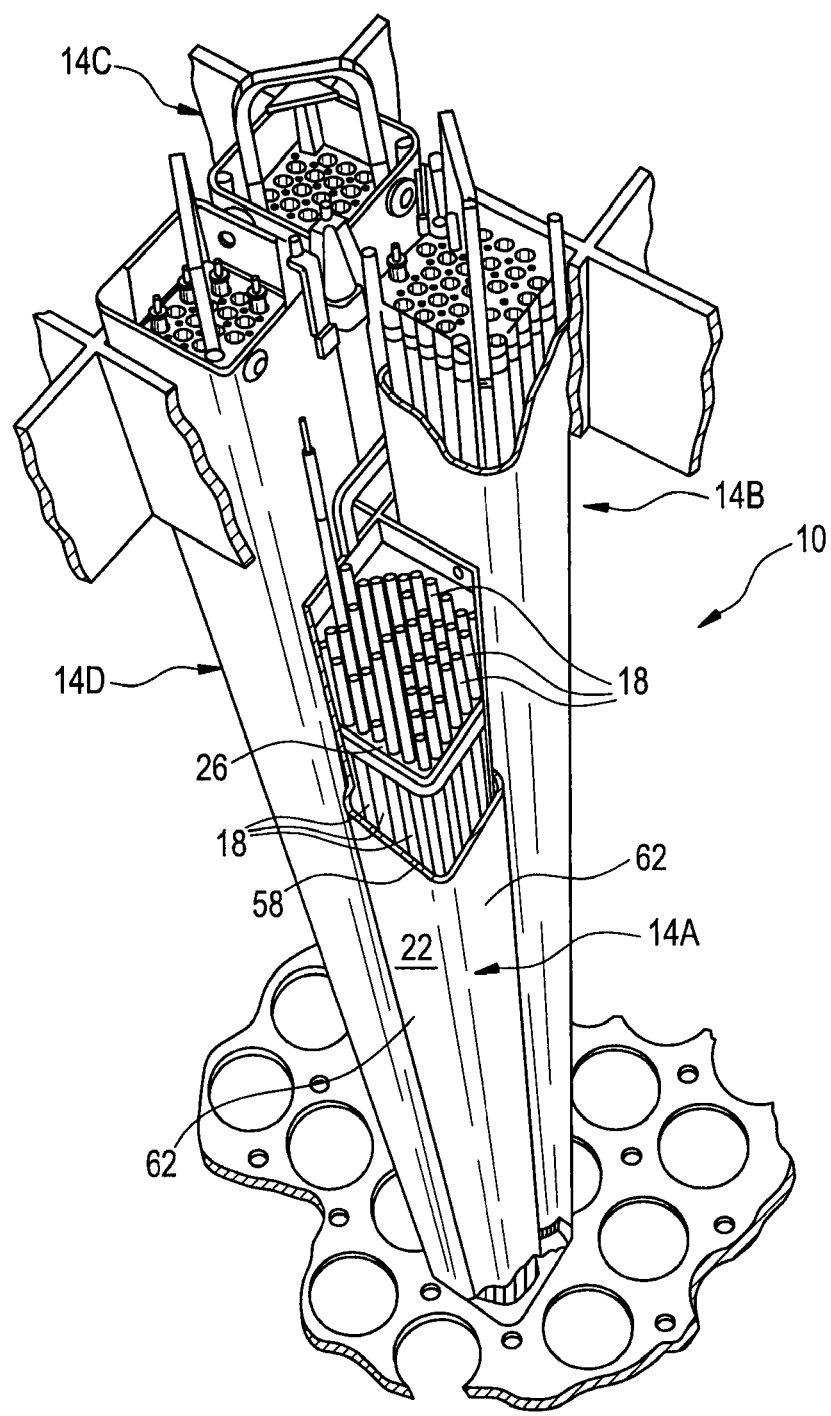

The following description is merely exemplary in nature and is in no way intended to limit the present teachings, application, or uses. Throughout this specification, like reference numerals will be used to refer to like elements.

Referring to FIG. 1, a perspective sectional view of an exemplary portion of nuclear reactor core 10, e.g., a portion of a boiling water nuclear reactor core, is provided. The exemplary portion of the nuclear reactor core 10 includes four fuel bundles 14A, 14B, 14C and 14D through which, and around which, a liquid moderator, i.e., a coolant, flows when the fuel bundles 14A, 14B, 14C and 14D are installed and the reactor is functioning. Nuclear reactions within each fuel bundle 14A, 14B, 14C and 14D generate heat used to convert the coolant to steam that is used to generate electrical power. Each fuel bundle 14A, 14B, 14C and 14D is substantially the same in structure, form and function. Thus, for simplicity and clarity, only fuel bundle 14A will described herein.

The fuel bundle 14A generally includes a plurality of fuel rods 18 positioned within an elongate tubular channel 22 and held in a spaced apart relation with each other by at least one spacer grid 26. As described below, the spacer grid 26 is designed to: 1) maintain the arrayed fuel rods 18 substantially centered within the channel 22 to increase the power potential for the fuel bundle 14A; 2) greatly reduce structural damage to the spacer grids 26 and fretting damage to the fuel rods 18 that may occur during shipping of the fuel bundle 14A; and 3) assist in stripping entrained liquid moderator from the interior surfaces of the channel 22 as the liquid moderator flows through the channel 22 and around the fuel rods 18.

Although FIG. 1 only shows a single spacer grid 26 holding upper portions of the fuel rods 18 in the spaced apart relation, the fuel bundle 14A can include one or more additional spacer grids 26, not shown, that hold other portions of the fuel rods 18. For example, in various embodiments, the fuel bundle 14A can include a second spacer grid 26 (not shown) that holds lower portions of the fuel rods 18 in the spaced apart relation. Although additional spacer grids 26 are not shown, it should be readily understood by one skilled in the art that description herein of the various embodiments of the shown spacer grid 26 is also applicable to any additional spacer grids 26 not shown, e.g., the second spacer grid 26 mentioned above. However, it should further be understood that all spacer grids 26 of fuel bundle 14A do not necessarily need to be of the same embodiment. That is, a first spacer grid 26 of fuel bundle 14A can be structured in accordance with one of the various embodiments described herein, while a second spacer grid of fuel bundle 14A can be structure in accordance with another of the various embodiments described herein. Since all spacer grids 26 of the fuel bundle 14A are structured and function in accordance with the various embodiments described herein, for simplicity and clarity, only a single spacer grid 26 will be described herein.

Figure 2A:
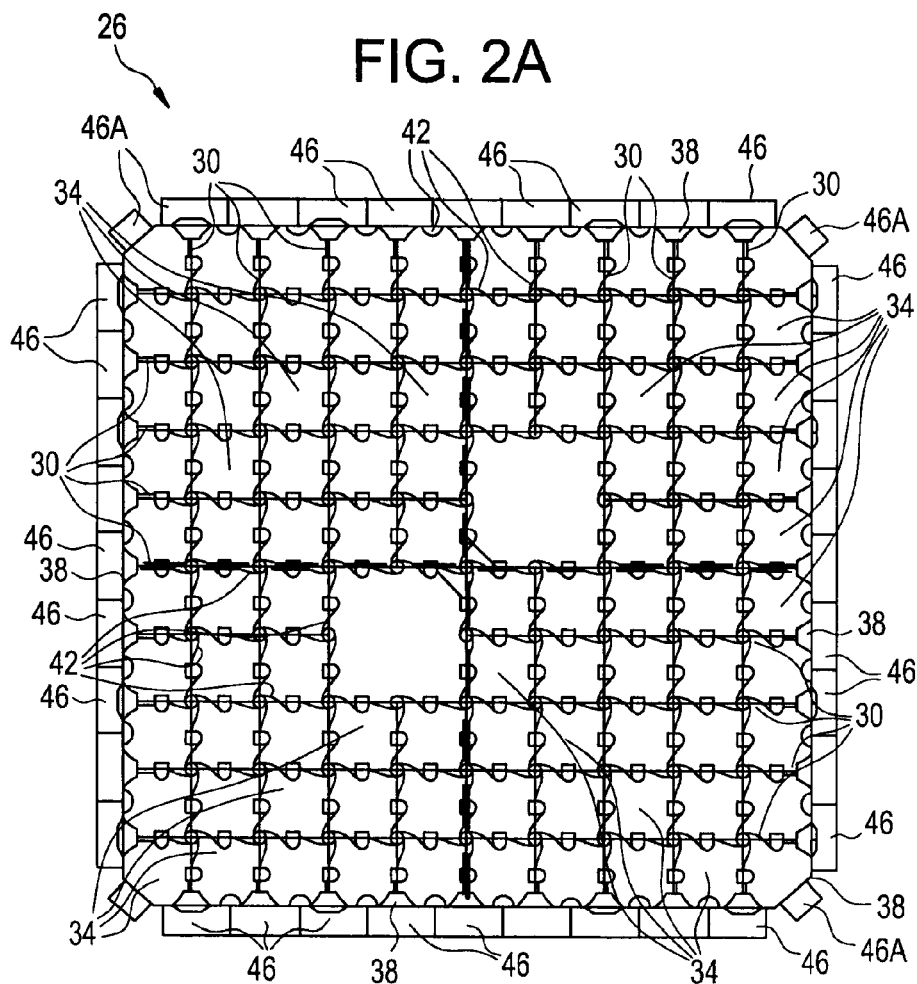
Figure 2B:
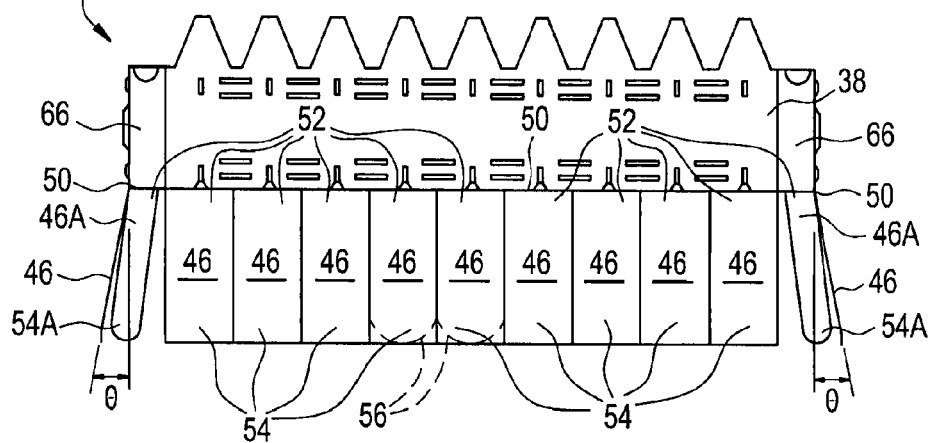

Referring now to FIGS. 2A and 2B, in accordance with various embodiments, the spacer grid 26 includes a plurality of interstitial dividers 30 that form an array of cells 34. Although the interstitial dividers 30 are shown and described herein as being cross-crossing dividers, the interstitial dividers 30 can have any suitable structure. For example, the interstitial dividers 30 can be a plurality of interconnected short tube sections. Each cell 34 is structured to retain a respective one of the fuel rods 18 (shown in FIG. 1) to form an array of equally spaced fuel rods 18. The spacer grid 26 additionally includes a perimeter band 38 that peripherally surrounds the dividers 30. More particularly, opposing ends of each divider 30 are connected to the perimeter band 38 to form the spacer grid 26. In various embodiments, each cell 34 includes a plurality, e.g., four, fuel rod centering devices 42 connected to the respective dividers 30 and/or the perimeter band 38. The fuel rod centering device 42 can be any suitable device structured to provide stability and centering of the fuel rods 18 within the cells 34, such that the spacing of the fuel rods within array are maintained to provide more efficient power generation of the fuel bundle 14A. For example, the centering devices 42 can be leaf-spring-like device connected to the respective dividers 30 within each of the cells 34.

As illustrated, the perimeter band 38 forms the outer sides of the peripheral cells 34, i.e., the outermost cells along the periphery of the cell array. Thus, the perimeter band 38 forms four sides of spacer grid 26. As best illustrated in FIG. 2B, the perimeter band 38 includes a plurality of spring tabs 46 along and extending from an edge 50 of the perimeter band 38. In various embodiments, the spring tabs 46 are integrally formed with the perimeter band 38. However, in other embodiments, the spring tabs 46 can be affixed to the perimeter band 38 using any suitable mounting means, e.g., tack welding, soldering, riveting, etc. Each spring tab 46 includes a proximal end 52 that joins the spring tab with the perimeter band edge 50. Moreover, each spring tab 46 extends from the edge 50 at an angle θ formed at the junction of the spring tab proximal end 52 and the perimeter band edge 50. Particularly, each spring tab 46 extends at the angle θ away from the from the dividers 30 such that a distal end 54 of each spring tab 46 will contact an interior surface 58 (shown in FIG. 1) of a respective one of the walls 62 (shown in FIG. 1) of the channel 22 in which the arrayed fuel rods 18 can be inserted to form the fuel bundle 14A.

The angle θ can be any angle suitable to provide simultaneous contact of each of the spring tabs 46 with each of the respective interior surfaces 58 of the respective channel walls 62. More particularly, the perimeter band 38 and spring tabs 46 are structured to have an angle θ such that each spring tab 46 independently and simultaneously exerts a desired spring force against the respective interior surface 58. Thus, each spring tab 46 is formed as separate and independent structure from the other spring tabs 46 and applies a separate, independent spring force against the channel walls 62 that is based on the angle θ. In various embodiments, the angle θ of each spring tab 46 is substantially identical such that each spring tab 46 applies substantially equal force to the channel walls 62. In various alternate embodiments, various different spring tabs 46 extend from the edge 50 at various different angles θ, such that different spring tabs 46 apply different spring forces against the channel walls 62.

The spring tabs 46 apply force against the channel walls 62 such that the spacer grid 26, and thus the arrayed fuel rods 18, is retained in a laterally centered orientation within the channel 22 when the channel 22 is installed in the reactor. By maintaining the arrayed fuel rods 18 in a laterally centered orientation, i.e., substantially centered about a longitudinal center axis of the channel 22, power generation of the fuel bundle 14A can be maximized. As illustrated in FIG. 2B, in various embodiments, each spring tab 46 is formed to be substantially flat and straight in length. That is, each spring tab 46 is substantially straight and flat along both the longitudinal and lateral axes of the respective spring tab 46. However, in various embodiments, the distal end 54 of each spring tab 46 is curved slightly back away from the respective channel wall interior surface 58 to allow easier longitudinal movement of arrayed fuel rods 18 within the channel 22.

In various other embodiments, in order to minimize the pressure drop impact of the curved back spring tab distal end 54, the distal end 54 of one or more of the spring tabs 46 can include a radius 56 (indicated in phantom in FIG. 2B). The radius 56 forms the distal end 54 such that the center portion of the distal end 54 curves back away from the respective channel wall 62 while the opposing outer edge portions of the distal end 54 contact the respective channel wall 62.

Furthermore, in various embodiments, the perimeter band 38 and spring tabs 46 are structured such that the spring tabs 46 apply sufficient spring force against the channel wall interior surfaces 58 to substantially reduce the risk of damage to the arrayed fuel rods 18 within the channel 22 during shipping of the fuel bundle 14A More particularly, the perimeter band 38 and spring tabs 46 are structured such that the spring tabs 46 apply sufficient spring force against the channel wall interior surfaces 58 to dampen lateral movement of the arrayed fuel rods 18 within the channel during shipping, thereby preventing damage to the fuel rods during shipping of the fuel bundle 14A.

Further yet, in various embodiments, the perimeter band 38 and spring tabs 46 are structured such that the spring tabs 46 apply sufficient spring force against the channel wall interior surfaces 58 to strip liquid moderator entrained on the channel wall interior surfaces 58 from the respective surfaces 58. That is, when fuel bundle 14A, as described above, is installed in the core of a nuclear reactor and a coolant is passed through the core and fuel bundle 14A, the spring tabs 46 will interfere with the flow of coolant that is entrained on the channel wall interior surfaces 58 to break up the entrained coolant flow and direct it toward the fuel rods 18. Thus, the spring tabs 46 are structured to contact the interior surfaces 58 with sufficient force to strip the entrained liquid moderator and direct the stripped liquid moderator toward the fuel rods 18, thereby increasing the thermo-nuclear power generating efficiency of the fuel bundle 14A.

As described above, the perimeter band 38 forms the outer sides of the cell array, i.e., the four sides of the spacer grid 26. In various embodiments, spacer grid 26 includes the four sides and at least one beveled corner 66. Additionally, in various embodiments, a corner spring tab 46A extends away from the edge 50 of each beveled corner 66 at the angle θ such that a distal end 54A of each corner spring tab 46A will contact the interior surface 58 of a respective corner of the channel 22.

Figure 3:
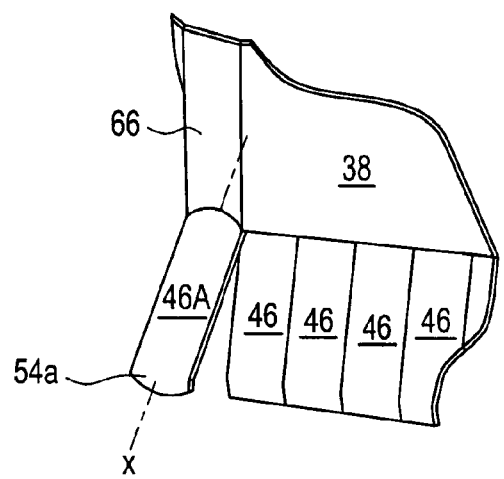

Referring now to FIG. 3, in various embodiments, each corner spring tab 46A is structured to be straight in length and have contoured lateral cross-section. That is, each corner spring tab 46A is contoured about a longitudinal axis X such that the distal end 54A is contoured to match a contour of the corner of the channel 22. Thus, the distal end 54A of the corner spring tab 46A fits substantially flush against the interior surface 58 of the respective corner of the channel 22 when the arrayed fuel rods 18 are inserted into the channel 22.

Referring again to FIGS. 2A and 2B, as described above, the spacer grid 26 includes four sides formed by the perimeter band 38 and the spring tabs 46 extends from the edge 50 at the angle θ formed at the junction of the spring tab proximal end 52 and the perimeter band edge 50. In various embodiments, the spring tabs 46 are contiguously formed along the entire length of each side of the spacer grid 26. That is, the spring tabs 46 extend side-by-side along the entire length of each side, absent any spacing between the spring tabs 46.

Figure 4:
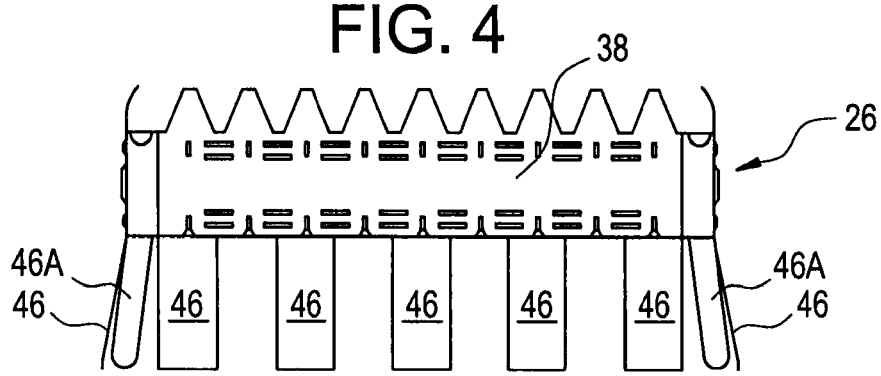

Referring now to FIG. 4, in various embodiments, the spring tabs 46 are equally spaced apart along the entire length of each side of the spacer grid 26. The spaces between the spring tabs 46 allows the coolant to flow freely between the spring tabs 46, while the spring tabs 46 direct the flow of coolant toward the fuel rods 18 and interrupt coolant entrained on the channel walls 62, as described above, and direct it toward the fuel rods 18.

Figure 5:
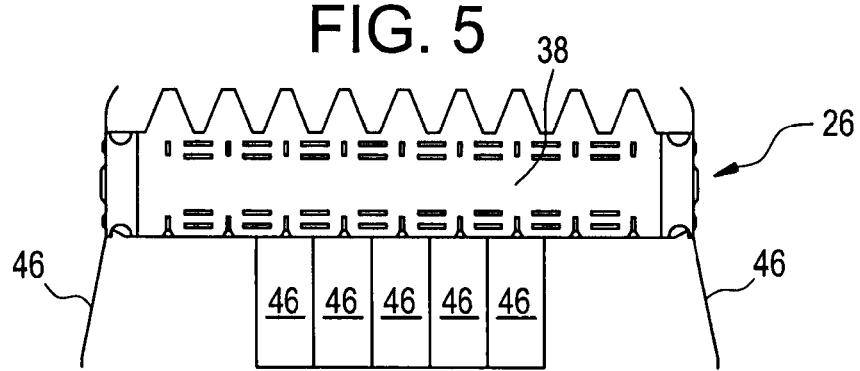
Figure 6:
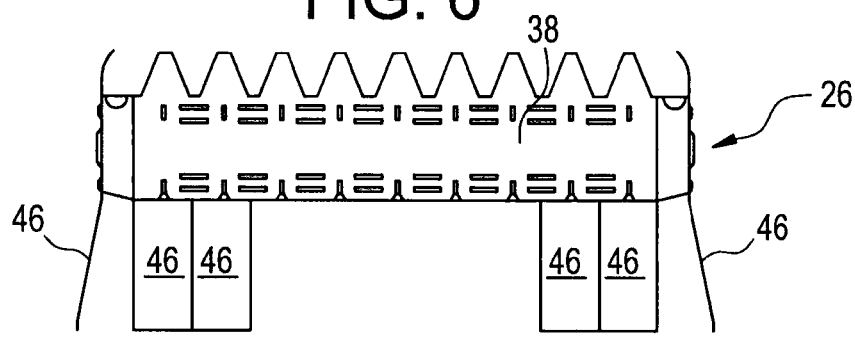
Figure 7:
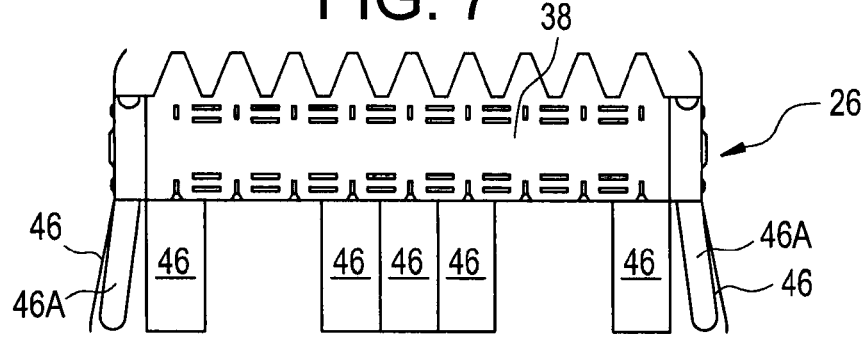
FIG. 7 is a side view of the spacer grid shown in FIG. 1, in accordance with still yet other various embodiments of the present disclosure.

Referring now to FIGS. 5 and 6, in various other embodiments, spring tabs 46 are formed in at least one contiguous group, i.e., at least two side-by-side spring tabs 46, along at least one portion of each side of the spacer grid. The spaces between the one or more contiguous groups of spring tabs 46 allows the coolant to flow freely between the group(s), while the groups of spring tabs 46 direct the flow of coolant toward the fuel rods 18 and interrupt coolant entrained on the channel walls 62, as described above, and direct it toward the fuel rods 18. In yet other embodiments, as exemplarily illustrated in FIG. 7, the spring tabs are formed along each side of the spacer grid 26 to include at least one stand-alone spring tab 46 spaced apart from at least one group of contiguous spring tabs. Thus, coolant is allowed to flow freely through the spaces between the stand-alone spring tab 46 and contiguous group(s) of spring tabs 46, while the group(s) of spring tabs 46 direct the flow of coolant toward the fuel rods 18 and interrupt coolant entrained on the channel walls 62, as described above, and direct it toward the fuel rods 18.

Ultimately, the positioning and spacing of the spring tabs 46 along the sides and beveled corners of the spacer grid 26 can be selectively chosen to provide optimal critical power and pressure drop performance of the fuel bundle 14A within the nuclear reactor.

Figure 8:
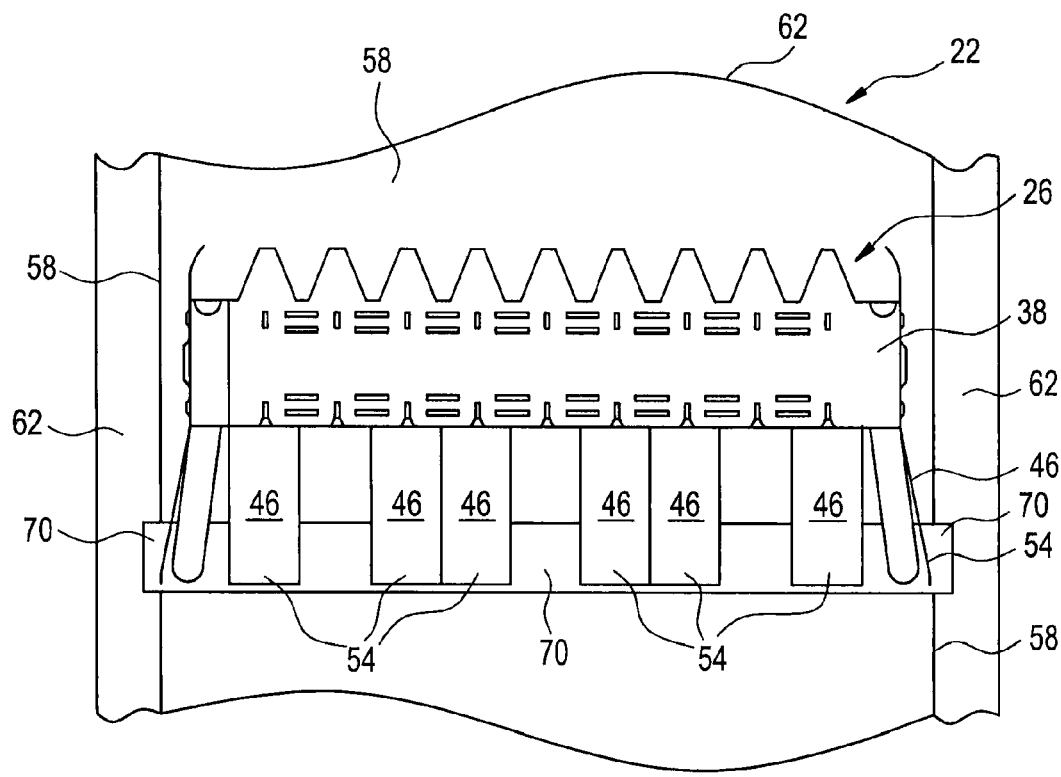
FIG. 8 is a cut-away sectional view of the spacer grid of FIG. 1 positioned within a channel of the fuel bundle shown in FIG. 1, in accordance with various embodiments of the present disclosure.

FIG. 8 is an exemplary illustration of the spacer grid positioned within the channel 22 of the fuel bundle 14A with a wall of the channel 22 and the fuel rods 18 removed for clarity. In various embodiments, the interior surfaces 58 of the channel walls include a transverse furrow 70 structured to receive the distal ends 54 of the spring tabs 46. When the arrayed fuel rods 18 are inserted into the channel 22, the spring tabs will slide along the channel wall interior surfaces 58 until the curved-back distal ends 54 are positioned within the respective transverse furrow 70. Therefore, any impedance of the flow of liquid moderator between the channel walls 62 and the perimeter band 38 that may occur due to the curved-back portion of distal ends 54 will be eliminated because the curved-back portion will not extend into the liquid moderator flow.

Accordingly, as described herein, the spacer grid 26 of the fuel bundle 14A is structured to maintain the arrayed fuel rods 18 laterally centered within the channel 22, greatly reducing structural damage to the spacer grids 26 and fretting damage to the fuel rods 18 that may occur during shipping of the fuel bundle 14A, and assist in stripping entrained liquid moderator from the interior surfaces 58 of the channel 22. Therefore, the spacer grid 26 increases the power potential for the fuel bundle 14A when it is utilized in a reactor and protects the fuel rods 18 from damage during shipping.

The description herein is merely exemplary in nature and, thus, variations that do not depart from the gist of that which is described are intended to be within the scope of the teachings. Such variations are not to be regarded as a departure from the spirit and scope of the teachings.

What is claimed is:
1. A spacer grid for a nuclear reactor fuel bundle, said grid comprising:

a plurality of interstitial dividers that form an array of cells, each cell structured to retain a respective one of a plurality of fuel rods to form an array of equally spaced fuel rods; and a perimeter band peripherally surrounding the dividers, the perimeter band including a plurality of spring tabs formed along a bottom edge of the perimeter band, each of the spring tabs having a proximal portion having a substantially straight length extending from the bottom edge of the perimeter band at an angle away from the dividers and a distal portion configured to contact and apply a spring force to an interior surface of a respective one of a plurality of walls of a channel in which the arrayed fuel rods can be inserted to form the fuel bundle, the plurality of spring tabs being configured such that each of the distal portions contacts and applies the spring force to the interior surface below a bottom edge of the perimeter band, each of the springs tabs being further configured so that a length of the proximal portion is longer than a length of the distal portion.

2. The spacer grid of claim 1, wherein each spring tab is formed to be a separate and independent structure from the other springs tabs.

3. The spacer grid of claim 1, wherein the cell array includes four sides formed by the perimeter band, and the spring tabs are contiguously formed along the entire length of each side.

4. The spacer grid of claim 1, wherein the cell array includes four sides formed by the perimeter band and the spring tabs are equally spaced apart along the entire length of each side.

5. The spacer grid of claim 1, wherein the cell array includes four sides formed by the perimeter band and the spring tabs are formed in at least one contiguous group along at least one portion of each side, the contiguous group including at least two spring tabs.

6. The spacer grid of claim 1, wherein the cell array includes four sides formed by the perimeter band and the spring tabs are formed along each side to include at least one stand-alone spring tab spaced apart from at least one group of at least two contiguous spring tabs.

7. The spacer grid of claim 1, wherein the cell array includes four sides and at least one beveled corner formed by the perimeter band and the spring tabs include at least one corner spring tab extending at an angle from a respective beveled corner of the cell array.

8. The spacer grid of claim 7, wherein the at least one corner spring tab has a straight length and is contoured about a longitudinal axis of the at least one corner spring tab, the contour matching a contour of a corner of the channel such that the distal end of the at least one corner spring tab will fit flush within the channel corner when the arrayed fuel rods are inserted into the channel.

9. The spacer grid of claim 1, wherein each spring tab is structured to contact the interior surface of the channel walls such that when the arrayed fuel rods are inserted within the channel and the channel is installed within a nuclear reactor, the distal ends of the spring tabs will interfere with a flow of coolant through the channel that is entrained on the channel walls to break up the entrained flow and direct the entrained flow toward the fuel rod array.

10. The spacer grid of claim 1, wherein the spring tabs are structured to provide sufficient spring force, based on the angle, against the channel walls, when the arrayed fuel rods are inserted within the channel and the channel is installed within a nuclear reactor, to maintain the arrayed fuel rods substantially centered within the channel during operation of the nuclear reactor to maximize power generation of the fuel bundle.

11. The spacer grid of claim 1, wherein the spring tabs are structured to provide sufficient spring force against the channel walls, when the arrayed fuel rods are inserted within the channel, to dampen movement of the arrayed fuel rods within the channel and prevent damage to the fuel rods during shipping of the fuel bundle.

12. A spacer grid for a nuclear reactor fuel bundle, said grid comprising:

a plurality of interstitial dividers that form an array of cells, each cell structured to retain a respective one of a plurality of fuel rods to form an array of equally spaced fuel rods; and a perimeter band peripherally surrounding the dividers such that the cell array is a four-sided cell array, the perimeter band including, a plurality of independent spring tabs formed along a edge of the perimeter band and extending from the edge at an angle away from the dividers, each spring tab including, a proximal end portion that joins the spring tabs with the perimeter band edge and at which the angle away from the dividers is formed; and a distal end, each spring tab structured such that the distal ends will contact and apply a spring force to an interior surface of a respective one of a plurality of walls of a channel in which the arrayed fuel rods can be inserted to form the fuel bundle, each spring tab being configured such that the distal end contacts and applies the spring force to the interior surface below a bottom edge of the perimeter band, wherein a length of the distal end is less than a length of the proximal end portion.

13. The spacer grid of claim 12, wherein each spring tab is formed to have a substantially straight, flat length.

14. The spacer grid of claim 12, wherein the spring tabs are contiguously formed along the entire length of each side.

15. The spacer grid of claim 12, wherein the spring tabs are equally spaced apart along the entire length of each side.

16. The spacer grid of claim 12, wherein the spring tabs are formed in at least one contiguous group along at least one portion of each side, the contiguous group including at least two spring tabs.

17. The spacer grid of claim 12, wherein the perimeter band forms the four-sided cell array with at least one beveled corner and the plurality of spring tabs include at least one corner spring tab extending at an angle from a respective beveled corner of the cell array.

18. The spacer grid of claim 17, wherein the at least one corner spring tab has a straight length and is contoured about a longitudinal axis of the at least one corner spring tab, the contour matching a contour of a corner of the channel such that the distal end of the at least one corner spring tab will fit flush within the channel corner when the arrayed fuel rods are inserted into the channel.

19. A fuel bundle for a nuclear reactor, said fuel bundle comprising:

a plurality of fuel rods:

a spacer grid including a plurality of interstitial dividers and a perimeter band peripherally surrounding the dividers to form an array of cells, each cell having a respective one of the fuel rods therein to form an array of equally spaced fuel rods;

an elongate tubular channel in which the arrayed fuel rods are housed; and a plurality of spring tabs extending from an edge of the perimeter band at an angle away from the dividers such that a distal end of each spring tab contacts and applies a spring force to an interior surface of one of a plurality of walls of the channel, the plurality of spring tabs being configured such that each of the distal ends contacts and applies the spring force to the interior surface below a bottom edge of the perimeter band, wherein each spring tab is further configured to change a magnitude of a spring force applied against the interior surface of one of a plurality of walls of the channel in response to a movement of the perimeter band with respect to the channel.

20. The fuel bundle of claim 19, wherein an interior surface of each channel wall includes a transverse furrow in which distal ends of the respective spring tabs are positioned.

21. The fuel bundle of claim 19, wherein the cell array includes four sides formed by the perimeter band, and the spring tabs are contiguously formed along the entire length of each side.

22. The fuel bundle of claim 19, wherein the cell array includes four sides formed by the perimeter band and the spring tabs are formed in at least one contiguous group along at least one portion of each side, the contiguous group including at least two spring tabs.

23. The fuel bundle of claim 19, wherein the cell array includes four sides and at least one beveled corner formed by the perimeter band and the spring tabs include at least one corner spring tab extending at an angle from a respective beveled corner of the cell array.

\* \* \* \* \*